(12) United States Patent
Perrin et al.

(10) Patent No.: US 8,007,178 B2
(45) Date of Patent: Aug. 30, 2011

(54) BEARING MATERIALS AND METHOD FOR THE PRODUCTION THEREOF

(75) Inventors: Carl Perrin, Loughborough (GB); Ian Matthew Laing, Rugby (GB)

(73) Assignee: Mahle Engine Systems Ltd. (GB)

( * ) Notice: Subject to any disclaimer, the term of this patent is extended or adjusted under 35 U.S.C. 154(b) by 1045 days.

(21) Appl. No.: 11/662,790

(22) PCT Filed: Sep. 28, 2005

(86) PCT No.: PCT/GB2005/003718
§ 371 (c)(1),
(2), (4) Date: Mar. 14, 2007

(87) PCT Pub. No.: WO2006/035220
PCT Pub. Date: Apr. 6, 2006

(65) Prior Publication Data
US 2008/0075878 A1  Mar. 27, 2008

(30) Foreign Application Priority Data
Sep. 29, 2004  (GB) .................................. 0421566.1

(51) Int. Cl.
*F16C 33/02* (2006.01)
(52) U.S. Cl. ................ 384/276; 384/907; 384/910
(58) Field of Classification Search .......... 384/276–279, 384/294, 907, 910, 912
See application file for complete search history.

(56) References Cited

U.S. PATENT DOCUMENTS

| | | | | | |
|---|---|---|---|---|---|
| 2,329,483 | A | * | 9/1943 | Queneau et al. | 384/279 |
| 3,540,862 | A | * | 11/1970 | Roemer | 428/208 |
| 3,941,903 | A | | 3/1976 | Tucker, Jr. | |
| 4,000,982 | A | * | 1/1977 | Ueda | 428/545 |
| 4,404,263 | A | | 9/1983 | Hodes et al. | |
| 5,209,578 | A | | 5/1993 | Eastham et al. | |
| 5,458,984 | A | | 10/1995 | Negwer | |
| 5,472,920 | A | | 12/1995 | Dubois et al. | |
| 6,139,191 | A | | 10/2000 | Andler et al. | |
| 6,273,612 | B1 | * | 8/2001 | Ono et al. | 384/276 |
| 6,329,022 | B1 | | 12/2001 | Schlegel et al. | |
| 6,416,877 | B1 | | 7/2002 | Perrin et al. | |
| 6,770,381 | B2 | * | 8/2004 | Kanayama et al. | 428/626 |
| 6,887,585 | B2 | * | 5/2005 | Herbst-Dederichs | 428/546 |
| 6,902,768 | B2 | * | 6/2005 | Smith et al. | 427/449 |
| 6,933,061 | B2 | * | 8/2005 | Nagaraj et al. | 428/633 |
| 2002/0155304 | A1 | * | 10/2002 | Tanaka et al. | 428/458 |
| 2003/0059137 | A1 | * | 3/2003 | Kawagoe et al. | 384/276 |
| 2003/0180565 | A1 | * | 9/2003 | Herbst-Dederichs | 428/553 |

FOREIGN PATENT DOCUMENTS

| | | |
|---|---|---|
| DE | 28 53 724 A1 | 6/1980 |
| JP | 07-278721 A | 10/1995 |
| JP | 2002-069606 A | 3/2002 |
| WO | WO 99/47723 A1 | 9/1999 |

* cited by examiner

*Primary Examiner* — James Pilkington
(74) *Attorney, Agent, or Firm* — Rader, Fishman & Grauer PLLC

(57) ABSTRACT

A plain bearing and a method for the production thereof is described, the method being for the deposition on a substrate of a layer of material having a metallic matrix, the method comprising the steps of: producing a powder of a desired aluminium-based alloy composition having a predetermined oxide content; depositing said aluminium alloy powder onto a bearing substrate by a metal spraying technique.

13 Claims, 7 Drawing Sheets

Y Profile

BEARING MATERIALS AND METHOD FOR THE PRODUCTION THEREOF

BACKGROUND OF THE INVENTION

The present invention relates to bearings, materials for bearings and to a method for the production thereof.

Bearings used in modern engines need to possess a combination of often conflicting properties. Bearings generally comprise several layers (see FIG. 2): a backing layer 2 of a strong material such as steel or bronze having a thickness in the range from about 1 to about 10 mm; a layer of a bearing alloy 4 usually based upon alloys of copper or aluminium and having a thickness in the range from about 0.1 to about 1 mm; and, optionally a so-called overlay layer 6 on top of the bearing alloy layer and having a thickness in the range from about 5 to about 50 µm. There may also be additional layers: one situated between the backing 2 and the bearing alloy layer 4 to assist in enhancing adhesion between these two layers and comprising, for example, a thin layer (generally about 5 to 50 µm, although much thicker layers up to about 300µ have been known) of aluminium or an aluminium alloy, nickel or another material as are known in the bearing art in the case of an aluminium-based bearing alloy 4. A further layer, a so-called interlayer, may be situated between the bearing alloy layer 4 and the overlay layer 6 and be present for the purpose of enhancing adhesion between the two layers and/or acting as a barrier to prevent or minimise unwanted diffusion of alloying constituents between the two layers. Such interlayers are usually very thin, of the order of about 0.5 to 5 µm.

Where present, the overlay layer provides the actual running or sliding surface between the bearing itself and a co-operating shaft journal. The overlay is generally a relatively soft material being based upon alloys having tin, lead, cadmium or aluminium as their main constituent. The purpose of the overlay, which is generally softer than the bearing alloy layer, is to provide a conformable layer able to accommodate small misalignments between the bearing and shaft journal caused due to imperfections in the machining processes involved in the bearing and engine manufacturing processes, i.e. the overlay possesses the characteristic of conformability. The overlay layer must also be seizure resistant, fatigue resistant, corrosion resistant, wear resistant and provide for embeddability of dirt and debris carried in the lubricating oil. Good fatigue resistance and wear resistance are generally associated with high strength and hardness. Good seizure resistance requires the material forming the running surface to have good compatibility which overlay alloys, due to their composition, generally possess. Similar requirements are also associated with the bearing alloy layer where no overlay is present and the bearing alloy itself forms the actual running or sliding surface. However, it should be born in mind that in some engines, due to the arduous service conditions, it is common for the overlay layer to be worn away thereby exposing the underlying bearing alloy layer which then becomes the actual sliding or running surface.

However, whilst wear resistance of such soft metal overlay layers is poor with modern, highly rated engines, the fatigue resistance is often better than might be expected having regard to the properties of the bulk alloys. This is due to the conformability of such alloys spreading the applied load over a greater area and ameliorating the effects of point loading on the underlying bearing alloy substrate layer which would otherwise occur without the soft layer.

Overlay materials based on alloys of tin or lead or cadmium have generally been deposited by electroplating techniques from aqueous solutions. Attempts to improve the strength and wear resistance of such alloys have led to the development of alloys comprising lead-tin-copper and to similar alloys but containing a proportion of hard particles co-deposited with the alloy and distributed throughout the alloy matrix. Examples of such hard particles include metal oxides, carbides, nitrides and the like. However, a problem with electro-deposition is that alloys based on aluminium metal are precluded from deposition from aqueous solutions and can only be deposited from fused-salt mixtures or solvent type solutions which renders aluminium-based overlay alloys impractical by this method of deposition. Further disadvantages are that such processes are generally expensive; even the best electro-deposited materials have marginal performance in the most demanding engine applications; and, the dimensional accuracy of the deposited overlay coating is somewhat lacking as coatings of this type are usually used in the as-deposited and unmachined condition.

In recent years people have attempted to improve the properties of overlays by depositing them by cathodic sputtering. This process enables overlay compositions based on an aluminium matrix to be deposited and also allows the deposition or generation of hard phases such as oxides and the like to be incorporated into the overlay alloy matrix. Cathodic sputtering is generally carried out at very high vacuums of about $10^{-6}$ torr which makes the process very expensive since only batch processes coating relatively small numbers of bearings at a time are possible and the sputtering process is inherently slow. DE 28 53 724 C describes the deposition of sliding coatings for bearings by cathodic sputter deposition. The coatings described include coatings based on aluminium alloys and are provided with a true dispersion of aluminium oxide formed in statu nascendi. Thus, the oxide content is generated by the oxidation of aluminium atoms as they are deposited due to the sputter chamber being provided with a source of oxygen. An example of a sputter deposited coating having a composition of Al20SnCu is given and which has a hardness of 130 Hv (which is harder than annealed mild steel, for example) compared with that of a cast material of the same composition which has a hardness of 35 Hv. The high hardness was maintained even after a heat treatment of 100 hours at 170° C. However, whilst such hard materials are likely to have improved wear resistance, they necessitate the use of a very hard co-operating shaft journal if excessive wear thereof is not to occur and they also have very inferior dirt embeddability properties. Indeed, the hardness and resistance to softening after heat treatment of such alloys made by cathodic sputtering is attributable to the aluminium and oxide phases being deposited on an atomic scale and producing a true dispersion hardened material according to the metallurgical definition thereof. As with electro-deposited coatings, the overlays produced are generally used in the as-deposited and unmachined condition and consequently dimensional accuracy is not as high as desired. Such dispersion hardened, sputter produced overlays may typically be harder by a factor of ×2 or more than the underlying bearing alloy on which they are deposited leading to unfavourable stress/strain distributions in operation. However, overlays produced by sputtering have produced the strongest overlay coatings currently available.

WO 99/47723, of common ownership herewith, describes the deposition of bearing alloy layers based on aluminium by high velocity oxy-fuel spraying (HVOF). The aluminium alloys containing tin or lead need to be heat treated after deposition in order to precipitate out and coarsen the soft phase in order to prevent excessive corrosion of the overlay coating layer under engine operating environments. Such heat treatments add to the cost of producing bearings and can have other undesirable effects. However, such spray-deposited coatings are generally machined after deposition thus, accuracy is high.

SUMMARY OF THE INVENTION

It is an object of the present invention to provide a method of depositing high performance bearing alloy layers and/or overlay coating layers based on alloys of aluminium and at a more economic cost than prior art processes.

According to a first aspect of the present invention, there is provided a method for the deposition on a substrate of a layer of material having a metallic matrix, the method comprising the steps of: producing a powder of a desired aluminium-based alloy composition having a predetermined oxide content and depositing said aluminium-based alloy powder onto a bearing substrate by a metal spraying technique.

In this specification, the term "aluminium-based alloy" means any alloy where the single largest component in terms of the composition of that alloy is aluminium.

In a preferred embodiment of the method of the present invention the metal spraying technique may be a high-velocity oxy-fuel spraying technique.

In the present specification, the oxide under consideration is principally aluminium oxide (also referred to as alumina or $Al_2O_3$). Alumina is a very hard, wear resistant phase unlike some of the other oxides such as tin oxide or copper oxide which incidentally may also be present in the aluminium alloy powder in the case of alloys comprising Al—Sn—Cu compositions, for example.

The aluminium-based alloy powder may possess about 0.5 to 5 weight % of oxide.

Preferably, the oxide content may lie in the range from 1 to 2 weight %.

In the present invention, the aluminium-based alloy powder is preferably produced by atomisation of a molten stream of liquid metal by a gas jet of inert gas such as nitrogen, for example, under a controlled atmosphere, for example. Preferably, the aluminium alloy particles are of generally rounded or spherical shape as these flow more easily in the spraying process and are easier to control.

In coatings produced by the method according to the present invention it has been found that whilst hardness is increased significantly over those alloys having little or no aluminium oxide content, the hardness produced is much less than with cathodic sputter produced coatings but, surprisingly, the wear resistance is still maintained at a very much higher level compared with other known aluminium-base overlay materials including sputter deposited overlay coatings.

A significant advantage of the coatings produced by the method of the present invention is that whilst the hardness of the overlay coating is higher than that of an essentially oxide-free coating, it is still generally lower than the hardness of the underlying bearing alloy layer on which the coating is deposited leading to favourable stress and strain distributions in the bearing during operation. As with prior art bearings, bearings made according to the method of the present invention may generally comprise a hard backing layer of steel or bronze, for example, a layer of another bearing material on the hard backing layer and a coating produced according to the present invention on top of the other bearing alloy layer thus producing a so-called tri-metal bearing (this ignores the presence of other minor interlayers which may or may not be present between the backing layer and the other bearing alloy and/or between the other bearing alloy layer and the overlay layer as described hereinabove). It has been found to be advantageous in terms of fatigue strength and conformability if the hardnesses of the constituent layers decrease from the hard backing layer to the relatively softer overlay layer; thus, the hardest layer will be the strong backing layer; the bearing alloy layer will be softer; and, the overlay layer will be the softest layer at the bearing surface.

Forged steel crankshafts have traditionally been used in highly rated engines because of their superior strength to that of cast iron. In more recent highly rated engines bearings having sputter deposited overlay coatings have been used due to their improved fatigue strength when subjected to cyclic loading compared with earlier electrodeposited overlay coatings. More recently still, cast irons have been developed which have the necessary strength characteristics and there is consequently a case for attempting to use cast iron since crankshafts made from cast iron are significantly less costly than those made from forged steel. However, a disadvantage of cast irons is their inherently more abrasive surface which wears away soft overlay alloys at a much greater rate than does steel. This is true of hard sputter deposited overlay coatings as well as earlier very soft electro-deposited coatings. In the present invention, rather than the wear resistance of the overlay being dependent upon the overlay itself being relatively very hard per se, the oxide phase in the coating produced by the method of the present invention is of a relatively coarser form than in sputter deposited material and acts as a mild abrasive on the journal surface thereby making the journal surface itself smoother and less abrasive to the bearing overlay surface. Furthermore, the relatively coarser nature of the oxide phase in overlays produced by the method of the present invention compared with sputter deposition does not produce a true dispersion strengthened material as does sputtering.

In the sprayed coatings made according to the method of the present invention, the oxide content is distributed in the matrix of the coating in a manner which corresponds to the morphology of the surfaces of the sprayed aluminium-based alloy particles themselves. Thus, if one imagines each individual particle being deposited has an oxide coating thereon, the oxide forms an interlocking network of sub-microscopic oxide particles which have locations generally corresponding to the particle surfaces as they strike the surface onto which they are sprayed. This distribution of oxide wherein the particles thereof, whilst being generally uniformly distributed throughout the matrix on a macro-scale, are non-homogeneously distributed in the matrix on a micro-scale and which is advantageous. The reason for this is that the bearing/journal sliding surfaces "see" a homogenous distribution of oxide particles which aid wear resistance by polishing the crankshaft journal to render that journal less abrasive. However, the dynamic stresses imparted to the matrix of the coating by the crankshaft during engine operation recognise a matrix which is mostly constituted by the bulk of the oxide-free metal since the oxide particles do not lie within what were the metallic alloy interiors of each aluminium-based alloy particle. Therefore, the great majority of the coating matrix retains the desirable physical properties of the metal alloy itself in terms of conformability, dirt embedability and compatibility, for example. This is in contradistinction to the types of overlay coating described hereinabove deposited by cathodic sputtering. In coatings produced by cathodic sputtering, each oxide particle is deposited simultaneously with each aluminium metal particle thus, the distribution of oxide particles is entirely homogeneous on both a macro-scale and on an atomic micro-scale giving rise to a true dispersion strengthened metal alloy coating which has sacrificed the desirable characteristics of conformability, dirt embedability and compatibility. It is believed that in the method of the present invention, the aluminium-based alloy coating matrix immediately surrounding the oxide region is dispersion strengthened whereas the bulk of the matrix remote from the oxide location is not so dispersion strengthened thus, a two-phase structure in terms of physical characteristics of strength and elastic modulus is produced.

In the method according to the present invention, the aluminium-based alloy powder particles preferably lie within a size range of about 10-145 µm. More preferably, the alloy powder particles lie within a size range of about 38-106 µm and, more preferably still the size range may lie within 45-75 µm. The closer the size range of particles the more uniform is the distribution of oxide within the sprayed coating. Furthermore, the oxide content of the alloy powder may be more easily controlled.

In addition to the desirable properties of the powder being formed due to the size ranges employed above, the same preferred size fractions are also advantageous in the subsequent HVOF spraying process. The closer the size range between largest and smallest particles, the more even is the heating of the sprayed particles. When the particles are too small, they tend to melt too quickly and coat the barrel of the HVOF gun; when too large, the particles tend to be insufficiently heated and this is reflected in the sprayed coating by visible prior particles not fully integrated with their surrounding matrix when micro-sections are taken for examination.

Notwithstanding the above comments regarding preferred powder particle sizes, it is possible to provide acceptable overlay coatings utilising powder particle fractions of: 20-45µ; 45-75 µm; and, 75-106 µm. In some engine bearing applications the more concentrated oxide distribution of the first size range is beneficial and in other applications the less concentrated oxide distribution of the third size range may be beneficial. Furthermore, the smaller particles of the first size range may have a greater concentration of oxide than the coarser size fractions due to the greater surface area of the powder. The ability to utilise a wide range of size fractions also makes the method according to the present invention more economic due to improved material utilisation.

The HVOF spraying technique is preferred over earlier known techniques of metal spraying such as flame and plasma spraying as it provides better control over the characteristics of the deposited coating in that levels of porosity, for example, are very much lower and the control over the level of additional oxide generation is also much enhanced. Indeed, this latter point is very important in the method of the present invention since it is desired to maintain, increase or otherwise alter the oxide content of the powder as deposited in a controlled manner so that the final deposited coating has a pre-determined oxide level.

The essential characteristic of the HVOF technique which distinguishes the process from other earlier spraying techniques is that the process has been developed to produce an extremely high spray velocity. Various types of spray gun exist where the powder being sprayed is fed into the combustion gases at various points in the gun. The spray gun generally uses a long nozzle which the combustion gases are forced down together with the powder so as to increase their velocity. Coatings produced by the HVOF technique are relatively very dense, strong and demonstrate low residual tensile stresses. The technique allows much thicker coatings to be applied than by earlier spraying techniques.

A significant advantage of the method of the present invention is the ability to produce a lead-free bearing. Lead-free bearing alloy substrate materials may be used and the overlay coating deposited by the method of the present invention may also be lead-free.

One example of an overlay coating composition deposited by the method of the present invention is AlSn20Cu having about 1.34 weight % of aluminium oxide therein.

The aluminium-base alloy overlay coatings produced by the method of the present invention are only limited by the need to be able to produce an initial starting powder of suitable particle size from the intended alloy.

The form or morphology of the interface between the deposited overlay and the underlying substrate surface is of the greatest importance to the performance of the bearing in service.

According to a second aspect of the present invention there is provided a method of making a bearing, the method comprising the steps of: providing a substrate for the subsequent deposition of a layer of a bearing material comprising an aluminium-based alloy; treating the surface of the substrate which is to be the interface between the substrate and the bearing material by an abrasion technique whereby said surface is provided with a varying roughness profile over the area of the substrate; depositing said bearing material onto said surface; boring back the surface of said bearing material to a pre-determined total wall thickness of said substrate and said bearing material so as to leave a bearing having varying thicknesses of bearing material on said substrate.

In a preferred embodiment of the second aspect of the present invention, the abrasion technique may comprise a grit-blasting process.

The objective of the abrasion process is to provide a surface on the substrate which has both a significant variation in surface roughness from one area to another and also a significant variation in the amount of substrate material removed from one area to another but which is of an essentially random nature, that is, there is no discernable directionality to the roughened surface so produced.

Although the term "abrasion" is used to describe a technique whereby a roughened substrate surface is produced onto which the bearing alloy is deposited, it is to be understood that such abrasion is preferably intended to move substrate material about on the surface rather than to remove it therefrom. Thus, the use of grit-blasting as a surface roughening technique tends to "push" the surface material about to create ridges and valleys without actually removing significant amounts of material from the surface.

The surface roughness of the substrate surface prior to deposition of the bearing material will determine the maximum and minimum thicknesses of the deposited bearing material or overlay coating after boring back of the bearing material surface after deposition thereof to a pre-determined overall bearing wall thickness.

In conventionally overlay coated bearings either by sputter coating or by electro-plating where the overlay thickness is substantially constant over the whole area of the bearing it is known that thick overlays have superior dirt embedability but poor fatigue strength whereas thin overlays demonstrate the reverse of this. In addition, conventional thin overlays are more prone to wearing through in a shorter space of time. In the present invention where a single bearing comprises areas randomly arrayed having adjacent regions of thick and thin overlays it has been found that the thicker overlay areas provide the required good dirt embedability characteristics whereas the adjacent areas of thin overlay provide high fatigue strength which appears to "protect" the thicker areas against fatigue.

In bearings according to the present invention, a typical "average" overlay thickness may lie in the range from 15 to 18 µm, for example. However, the maximum and minimum overlay thicknesses due to variable surface roughness of the underlying substrate interface may range from 40 to 0 µm, i.e. in the latter case the material of the underlying substrate is actually exposed at the surface of the bored-back bearing.

The substrate may be any suitable material. The substrate may be a bronze material, for example, which not only fulfils the requirements of an underlying bearing material but also provides the strong backing material thus, the substrate and backing material are formed by a monolithic material.

Naturally, the substrate may alternatively be of a conventional bearing alloy layer of an aluminium-based alloy or a copper-based alloy which is bonded to a strong backing layer such as steel, for example.

According to a third aspect of the present invention, there is provided a bearing when made by the method of the first or the second aspects of the present invention.

According to a fourth aspect of the present invention, there is provided a plain bearing for an internal combustion engine; the bearing comprising a strong backing material, a layer of a first bearing material on the backing and a layer of a second bearing material on the first bearing material wherein the second bearing material has been produced by spraying a powder having the composition of the second bearing material, the composition comprising from 0.5 to 5 weight % of aluminium oxide, the aluminium oxide being distributed through the matrix of the layer of second bearing in a manner generally corresponding to the surface morphology of the spray sprayed particles during deposition of the layer of the second bearing material.

According to fifth aspect of the present invention, there is provided a bearing comprising a substrate having a layer of an aluminium-based alloy bearing material deposited thereon; there being an interface between the substrate and the bearing material; said interface having a varying roughness profile over the area of the substrate; said bearing having a predetermined total wall thickness of said substrate and said bearing material formed by machining of said deposited bearing material; such that said bearing has a varying thickness of bearing material on said substrate.

BRIEF DESCRIPTION OF THE DRAWINGS

In order that the present invention may be more fully understood, examples will now be described by way of illustration only with reference to the accompanying drawings, of which.

DESCRIPTION OF THE PREFERRED EMBODIMENTS

Figure 1:
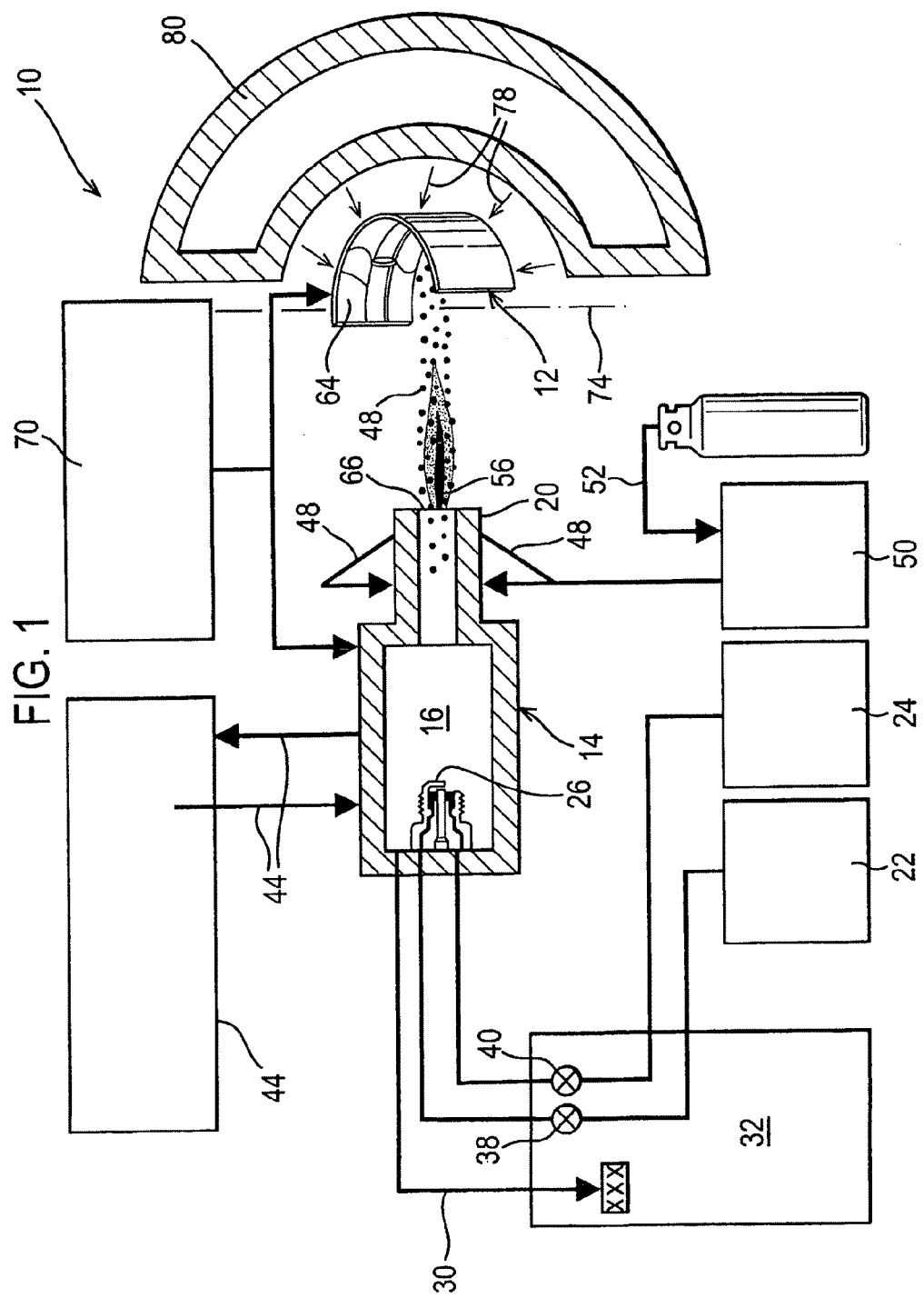
FIG. 1 shows a schematic illustration of an HVOF spraying apparatus for the deposition of an overlay coating on a half bearing shell.
Figure 2:
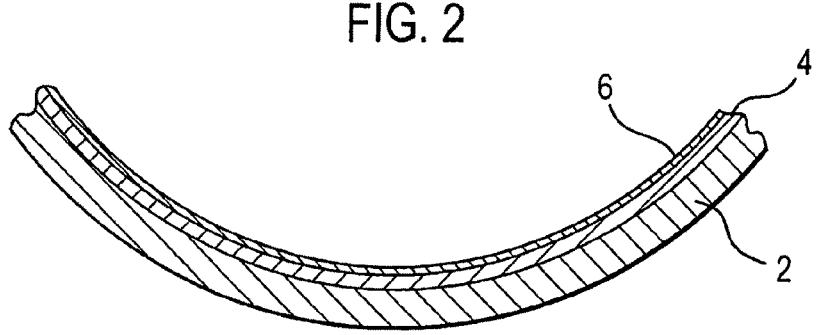
FIG. 2 shows a cross section through part of a half bearing shell.

Referring now to the drawings and where in FIG. 1 a schematic apparatus layout 10 is shown for the deposition of an overlay layer by HVOF on a half bearing shell 12. The apparatus 10 comprises an HVOF spray gun 14 having a combustion chamber 16 and a barrel 20. The combustion chamber 16 has a supply of fuel 22 and oxygen 24 which are ignited in the chamber 14 by a spark device 26. The pressure of combustion in the chamber 16 is sensed by a transducer (not shown) and the signals fed back 30 to a control system 32 from where the combustion pressure is controlled by means of adjusting the rate of input of fuel and oxygen by means of valves 38, 40 respectively. The spray gun 14 is cooled by means of chilled water 44 being circulated around the body thereof. Pre-alloyed powder 48 of the desired composition is held in a hopper 50 from where it is supplied by a known controlled rate feeder device (not shown) and carried by an inert gas such as argon or nitrogen 52 and fed to the barrel 20 of the spray gun 14 and injected into the combustion flame emanating from the combustion chamber 16. The powder 48 is heated in the flame 56 and accelerated by the burning gas flow towards the substrate bearing shell 12, where the mixture of molten and semi-molten powder is deposited on the surface 64 thereof. The distance between the muzzle 66 of the spray gun barrel and the surface 64 may be controlled automatically by a control system 70. The distance between the muzzle 66 and the substrate surface 64 has an effect on the velocity (kinetic energy) and amount of thermal energy transferred by the powder particles to the substrate. The bearing substrate 12 is held in a fixture (not shown) and is rotated about its axis 74 and also moved parallel to its axis 74 so as to ensure complete coverage of the surface 64 thereof. The back of the bearing shell 62 is cooled with compressed air jets 78 to control the temperature of the substrate 12 to prevent overheating and consequent formation of brittle intermetallic compounds forming at the interface between the sprayed layer and the substrate. Fume extraction 80 is also provided.

Alternatively, the bearings may be held stationary and the HVOF gun is manipulated in a suitable manner to produce the required deposit. A suitable method for manipulating the HVOF gun may be by a robotic arm, for example.

Half-bearings 12 were prepared as above and having compositions as set out in Table 1 below according to the present invention and specified at Samples A and B. Sample C comprised comparative bearings made by sputter deposition of an aluminium-based alloy coating having a composition of AlSn40Cu0.5 onto a substrate bearing alloy having a composition CuPb23Sn1.5, the substrate bearing alloy also having a steel backing.

TABLE 1

| | Constituent Wt % | | | | | |
| --- | --- | --- | --- | --- | --- | --- |
| | A | | B | | C | |
| | Subst | O/lay | Subst | O/lay | Subst | O/lay |
| Al | — | Rem | — | Rem | — | Rem |
| Sn | 1.5 | 20 | 8 | 20 | 1.5 | 40 |
| Cu | Rem | 1 | Rem | 1 | Rem | 0.5 |
| Pb | 23 | — | — | — | 23 | — |

TABLE 1-continued

| | Constituent Wt % | | | | | |
|---|---|---|---|---|---|---|
| | A | | B | | C | |
| | Subst | O/lay | Subst | O/lay | Subst | O/lay |
| Ni | — | — | 1 | — | — | — |
| Al$_2$O$_3$ | — | 1.34 | — | 1.42 | — | — |

The basic HVOF spray parameters for deposition of the coatings on Samples A and B were:

| | |
|---|---|
| Oxygen flow | 1550 scfh |
| Kerosene flow | 4.0 gal/h |
| Kerosene pressure | 75 psi |
| Powder feed rate | 12 g/min |
| Carrier gas flow | 12 scfh |
| Stand-off distance | 230 mm |
| Combustion pressure | 68-70 psi |
| Powder fraction | 45-75 μm |
| Gun traverse speed | 500 mm/s |

The coatings were applied onto the substrate as specified in Table 1 above up to a thickness of about 80 μm and then bored back to a nominal thickness of 15-18 μm.

The samples so produced were tested by extended duration wear testing in a known Viper wear testing machine and for fatigue resistance in a known Sapphire fatigue testing machine.

Viper wear test conditions were:

| | |
|---|---|
| Shaft speed: | 1000 rev/min |
| Load: | 3 kg |
| Oil temp: | 140° C. |
| Shaft roughness: | 0.1 μm Ra |
| Steel: | 38 msv5 unhardened |

Figure 3:
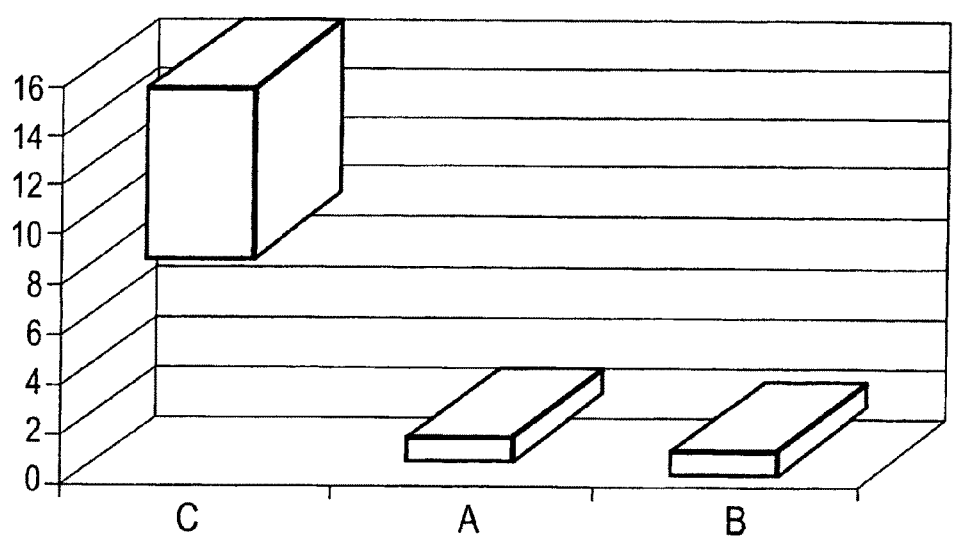
FIG. 3 shows a histogram comparing weight loss of two overlays according to the present invention with a known overlay deposited by sputter deposition.
Figure 4:
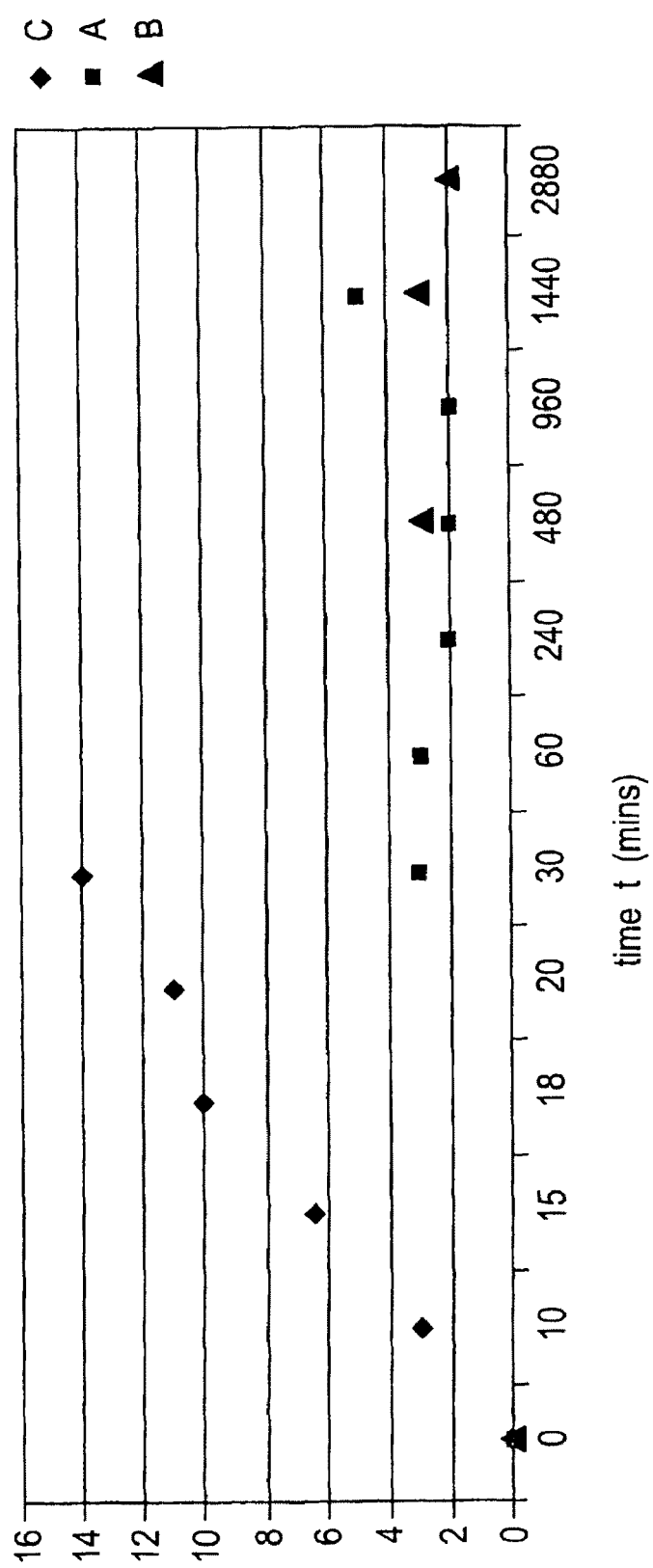
FIG. 4 shows a graph of overlay wear in a Viper wear testing machine when subjected to extended duration testing.

As may be seen in FIGS. 3 and 4 the wear of the known, hard sputter deposited overlay C was much greater than for the overlay coatings A and B deposited according to the present invention. FIG. 3 depicts the results in the form of a histogram whereas FIG. 4 depicts the results in graphical form, the latter Figure also providing information on the rate of wear with time. Thus, it may be seen that the known material, Sample C, looses approximately 14 mg of material after only 30 minutes of wear testing whereas at 30 minutes of testing the overlay materials according to the present invention, Samples A and B have lost approximately 2 to 4 mg of material but do not loose any further material over the remaining 2850 minutes of the test. Therefore, the wear rate of overlays according to the present invention falls to approximately zero after an initial "bedding-in" period. By contrast the overlay of Sample A had worn completely through to expose the underlying leaded-bronze substrate after only 18-20 minutes of testing. After 2880 minutes of testing the overlays of Samples A and B were not worn through and only a small thickness had been removed as evidenced by the low total wear in mg.

The Sapphire fatigue tests carried out have indicated that whilst no fatigue has occurred at loadings of 97-110 MPa on the known Sample C overlay layer, the overlay itself has completely worn through at this load, therefore, no further load increments would be relevant in the absence of an overlay layer. In contrast to this, overlay layers of both Samples A and B have reached fatigue ratings of 124 MPa (the maximum load attainable with the Sapphire machine) with the overlay layers still intact without having worn through to the underlying substrate layer.

Engine tests carried out with a 1.4 liter common-rail diesel engine having a cast-iron crankshaft have shown that the conventional sputter deposited overlay coated bearing of Sample C either wore through the overlay in a few minutes, or seized. In contrast to this, bearings according to Sample A have survived for 500 hours in the same engine also against a cast-iron crankshaft without excess wear or seizure.

In the Samples A and B it was noted that dirt embedability characteristics were retained and microsections of tested bearings were examined showing embedment of particles of ferrous and carbonaceous contamination in the bearing surfaces. Engine tests results have also shown a superior ability of bearings made according to the present invention to embed dirt particles compared with sputter deposited overlays.

Figure 5:
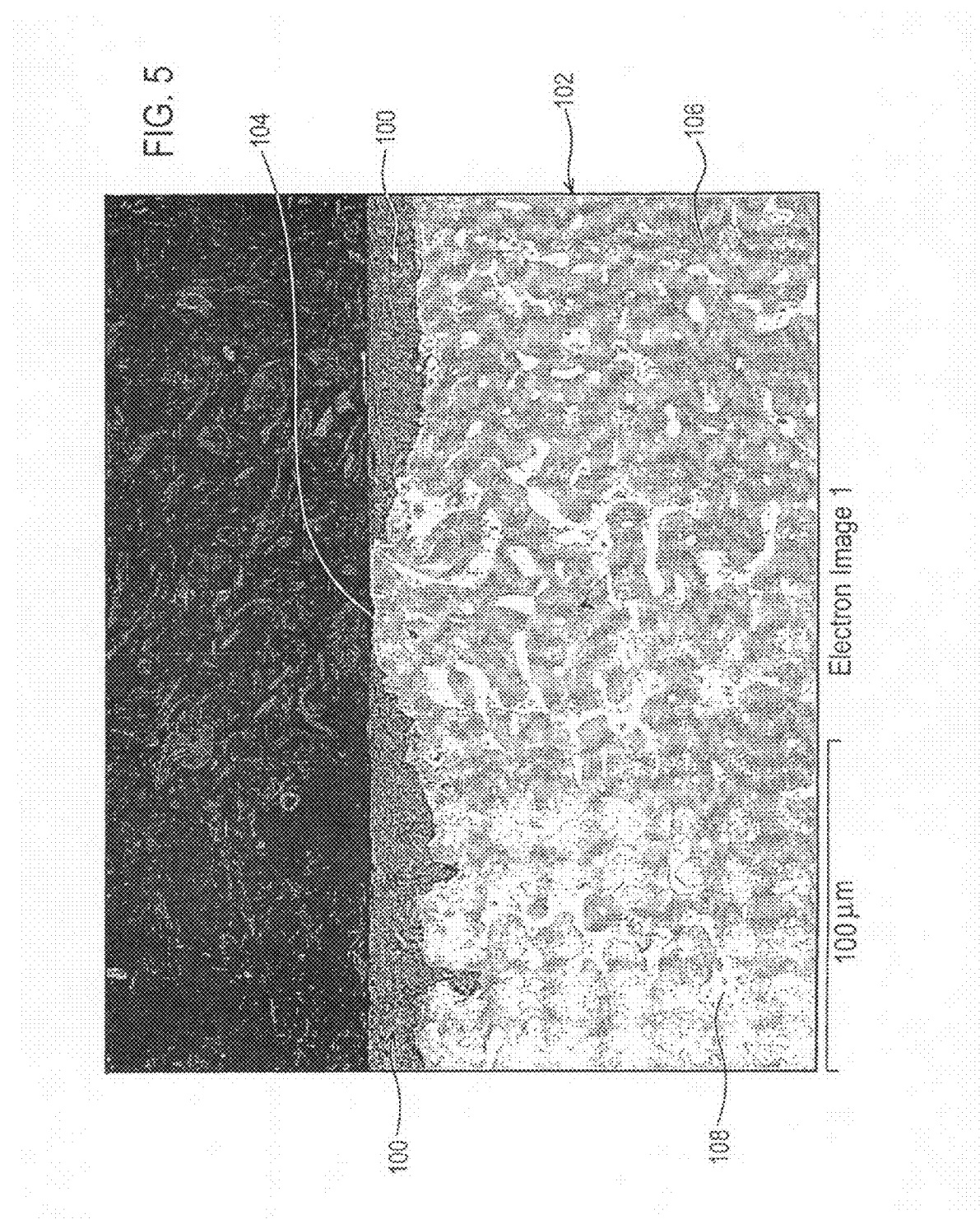
FIG. 5 shows a photomicrograph of Sample A showing the substrate layer and overlay layer in a condition prior to testing.
Figure 6:
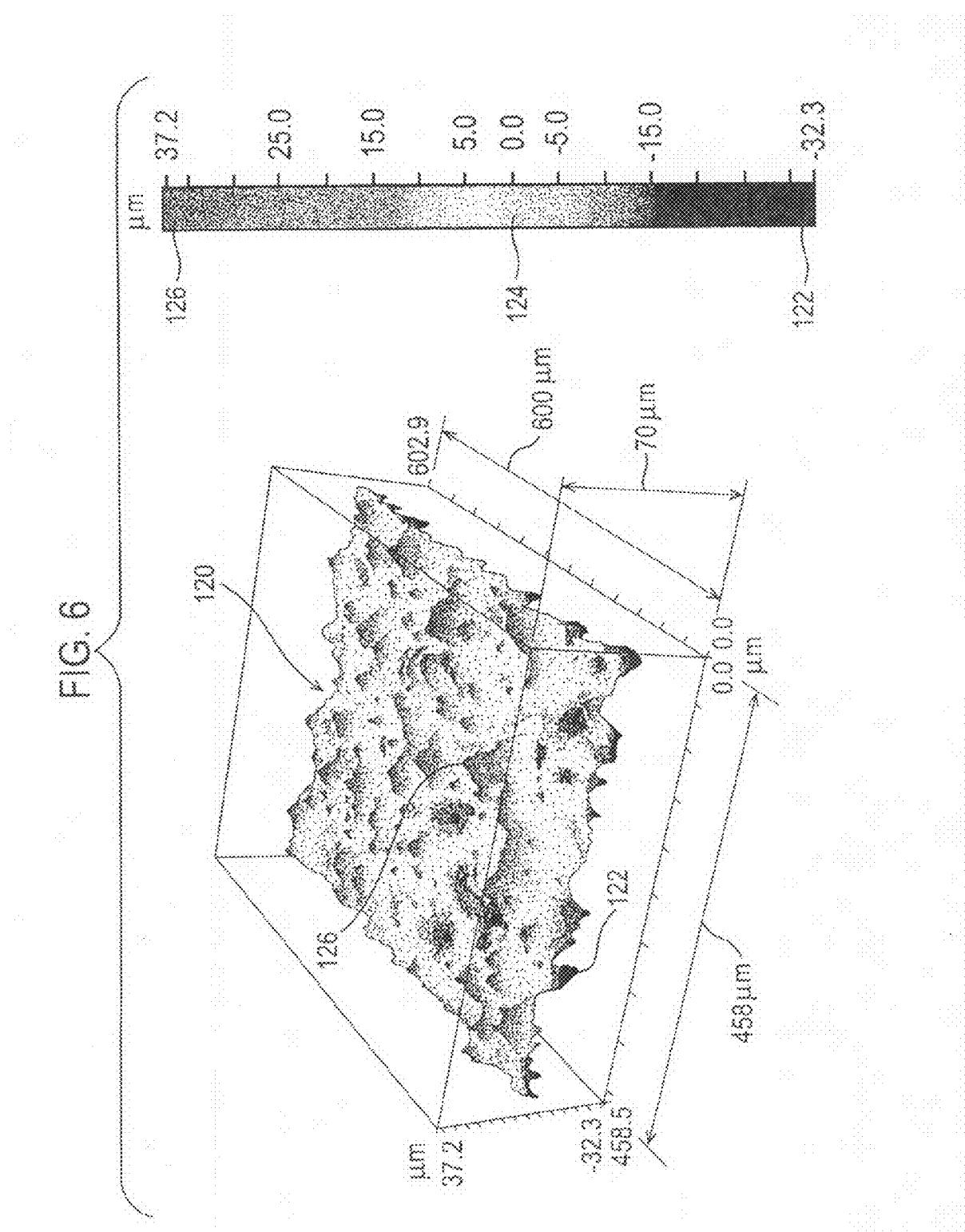
FIG. 6 shows a 3-dimensional graphic (perspective view) of a grit-blasted surface produced using white light interferometry of a substrate surface prior to deposition of an overlay layer according to the present invention.

FIG. 5 shows a photomicrograph of a cross section through a bearing made according to the present invention in Sample A prior to any testing. Thus, the bearing shows the running surface in a condition as manufactured. The surface comprises an overlay layer 100 which is essentially of varying depth as may be seen in FIG. 5 with the underlying substrate layer 102 being exposed at the surface at 104 after boring back of the spray deposited overlay coating 100. In FIG. 5, the light grey area 106 is constituted by the tin-bronze matrix and the white areas 108 are the lead phase. FIG. 6 shows a 3-dimensional perspective view by white light interferometry of a typical area of the interface 110 between the substrate 102 and the overlay layer 100 as shown in FIG. 5. The area shown by FIG. 6 is 458.5×602.9 μm. The perspective view of the surface 120 in FIG. 6 is shown in shades of grey which correspond to the scale on the right hand side of FIG. 6. This shows that the surface topography varies in a random manner between troughs or pits 122 (hereinafter referred to as troughs) which at their deepest are about 32 μm below a reference datum 124 and peaks 126 which at their highest are about 37 μm above the same reference datum 124. Between these extremes are troughs and peaks covering a whole range of intermediate values. This interface surface 120 is coated with the overlay material according to the procedure described with reference to FIG. 1 and is finally bored back to leave a constant wall thickness on the bearing 12 of FIG. 1. This results in an overlay layer 100 (as shown in a small area in FIG. 5) of randomly and constantly varying thickness which is determined by the troughs and peaks of the interface 120 formed by the grit blasting process. Thus the higher/highest peaks 126 are actually machined away to leave exposed substrate material 102 at the running surface of the final bearing and also deep areas of overlay 110 as may be seen in FIG. 5 nestling side-by-side. The effect of this random overlay thickness is that the overlay deposited above the deeper troughs provides areas which can accommodate wear debris or engine machining debris, for example, i.e. dirt embedability whilst the shallower overlay areas above the lower peaks provide for good fatigue resistance which protects the adjacent deeper overlay regions from fatigue. The areas of exposed substrate material 104 also contribute to enhanced fatigue resistance and possibly also to improved wear resistance.

Figure 7:
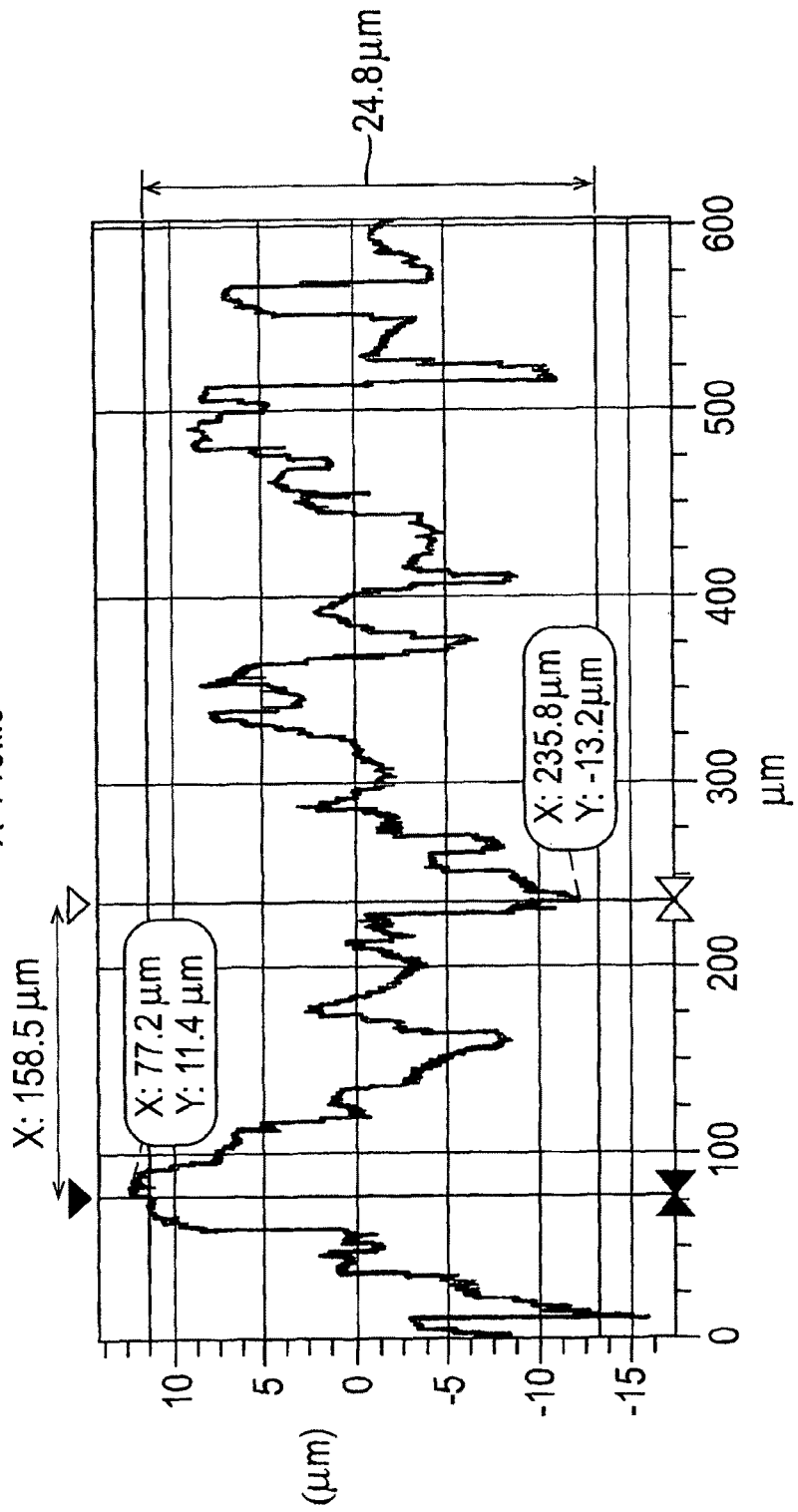
FIG. 7 shows a typical "X" profile of the surface roughness of an area typified by FIG. 6.
Figure 8:
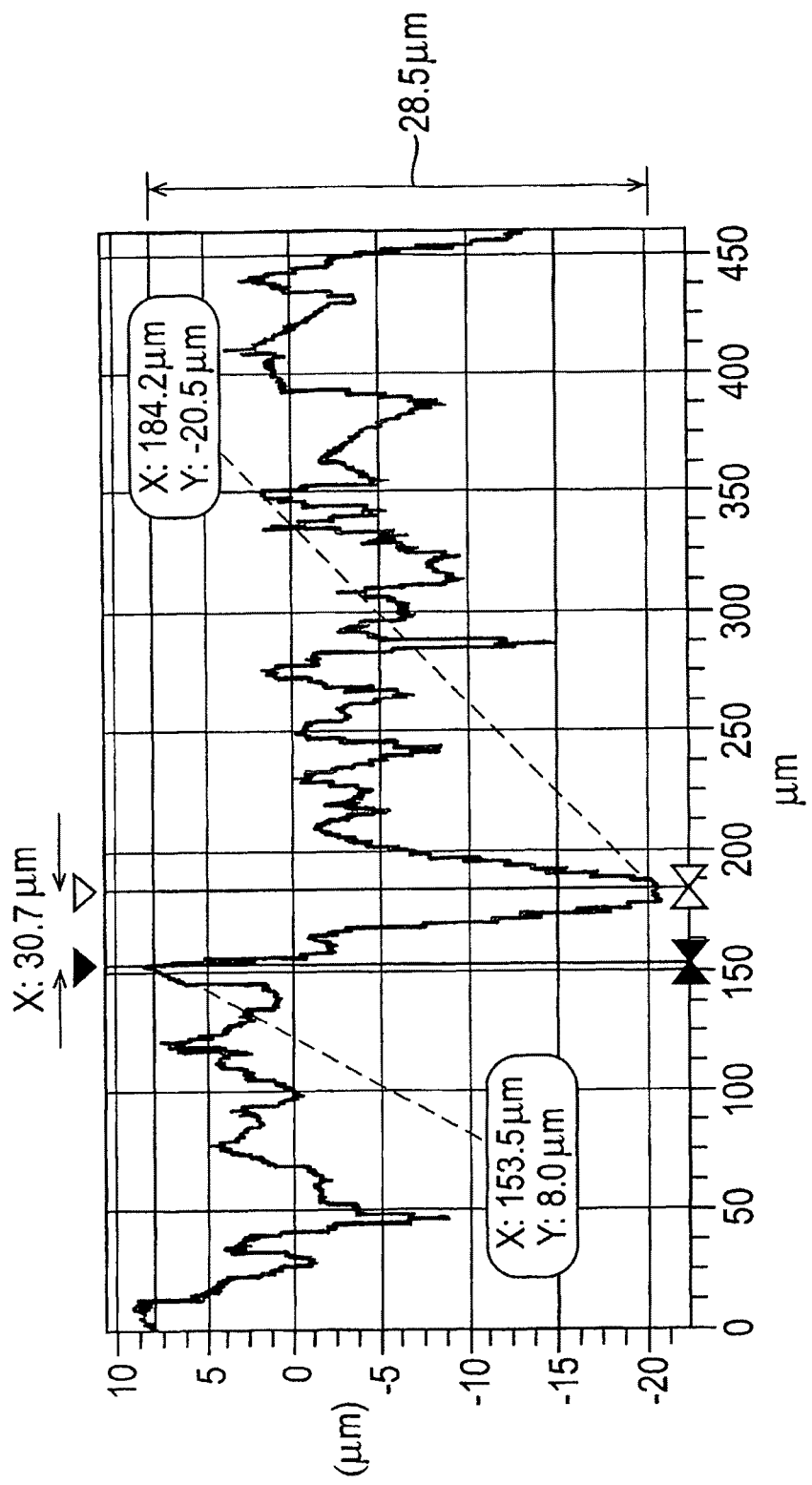
FIG. 8 which shows a typical "Y" profile (a profile taken orthogonally to that of FIG. 7) of the surface roughness of an area typified by FIG. 6

FIGS. 7 and 8 show typical roughness profiles at mutually orthogonal sections of the surface typified by that of FIG. 6, however, the surface roughness distribution in FIGS. 7 and 8 is different to that shown in FIG. 6 as they were produced using different grit-blasting parameters. It should be noted that when the bearing surface is machined back after deposition of the overlay layer that the final wall thickness will be chosen so that either no substrate material is exposed at the final surface or a random distribution of substrate material "spots" are produced over the final bored surface. It should be borne in mind when viewing FIGS. 7 and 8 that the actual surface topography is of a much smoother and more undulating nature than suggested in the Figures as the vertical axis is much exaggerated relative to the horizontal axis.

An additional advantage conferred by the interface described with reference to FIGS. 5 to 8 is that the adhesion of the overlay layer to the substrate is greatly enhanced due to the roughness of the interface.

Whilst the interface described above was produced by grit-blasting, any alternative process which produces a topography having troughs and peaks of varying depth and height in a dispersed manner may be employed.

Thus, it may be seen that the method according to the present invention produces overlay coatings having superior bearing characteristics but which may be made at a very much lower cost than conventional cathodic sputter produced bearings. Comparative pre-production trials have shown that bearings made according to the method of the present invention may be produced at a rate approximately three times greater than by cathodic sputtering.

The invention claimed is:

1. A plain bearing for an internal combustion engine; the bearing comprising a backing material, a layer of a first bearing material on the backing material and an overlay layer of a second bearing material on the first bearing material wherein said second bearing material is an alloy bearing material that has been produced by spraying of a powder having the composition of the second bearing material, wherein said powder composition comprises from 0.5 to 5 weight % of aluminium oxide in the form of a coating on individual powder particles, said aluminium oxide being non-homogeneously distributed, on a micro-scale, through a matrix of the layer of second bearing material in a network of oxide particles, said network generally corresponding to a morphology of the coated sprayed particles during deposition of said layer of said second bearing material.

2. The plain bearing according to claim 1 wherein said aluminium oxide content lies in the range from 1 to 2 weight %.

3. The plain bearing according to claim 1 wherein a depth of the overlay layer of said second bearing material varies from zero to 50 µm.

4. The plain bearing according to claim 3, wherein the depth of the overlay layer of the second bearing material is zero in at least one place within a perimeter of the overlay layer, the perimeter enclosing the at least one place.

5. The plain bearing according to claim 1 wherein said first bearing material is exposed in places in the surface after machining of said bearing.

6. The plain bearing according to claim 5, wherein said first bearing material is exposed in at least one place within a perimeter of the overlay layer, the perimeter enclosing the at least one place.

7. The plain bearing according to claim 1, wherein said first bearing material is exposed in places in the surface of the second bearing material.

8. A bearing comprising a substrate having an overlay layer of an aluminium-based alloy bearing material deposited thereon; there being an interface between the substrate and the overlay bearing material; said interface having a varying roughness profile over an area of the substrate; said bearing having a pre-determined total wall thickness of said substrate and said bearing material formed by machining of said deposited bearing material such that said bearing has a varying thickness of bearing material on said substrate wherein the bearing material has been produced by spraying of a powder comprising from 0.5 to 5 weight % of aluminium oxide in the form of a coating on individual powder particles, said aluminium oxide being non-homogeneously distributed, on a micro-scale, through a matrix of the overlay layer of the bearing material in a network of oxide particles, said network generally corresponding to a morphology of the coated sprayed particles during deposition of said overlay layer of said bearing material.

9. The bearing according to claim 8 wherein a depth of said overlay layer varies from zero to 50 µm over the surface area of the bearing.

10. The bearing according to claim 9, wherein the depth of said overlay layer is zero in at least one place within a perimeter of said overlay layer, the perimeter enclosing the at least one place.

11. The bearing according to claim 8 wherein said thickness of said overlay layer is randomly distributed over the surface area of the bearing.

12. The bearing according to claim 8, wherein said substrate material is exposed in at least one place within a perimeter of the overlay layer, the perimeter enclosing the at least one place.

13. The bearing according to claim 8, wherein said substrate material is exposed in places in the surface after machining of said deposited bearing material.

* * * * *